(12) United States Patent
Potts et al.

(10) Patent No.: US 7,241,094 B1
(45) Date of Patent: Jul. 10, 2007

(54) RESTRAINT CLIP

(75) Inventors: Stephen Potts, Cranberry Township, PA (US); Andrew Park, Pittsburgh, PA (US)

(73) Assignee: Epic Metals Corporation, Rankin, PA (US)

(*) Notice: Subject to any disclaimer, the term of this patent is extended or adjusted under 35 U.S.C. 154(b) by 0 days.

(21) Appl. No.: 11/024,196

(22) Filed: Dec. 28, 2004

Related U.S. Application Data

(63) Continuation-in-part of application No. 10/763,130, filed on Jan. 22, 2004, now abandoned.

(51) Int. Cl.
*F16B 27/00* (2006.01)
*F16B 39/02* (2006.01)
*F16B 39/04* (2006.01)
*F16B 21/00* (2006.01)

(52) U.S. Cl. .............. 411/85; 411/84; 411/86; 411/340; 411/344; 411/345; 411/87; 411/88

(58) Field of Classification Search ........... 411/84–90, 411/340, 344, 345; 151/41.7; 403/374.3, 403/256, 247
See application file for complete search history.

(56) References Cited

U.S. PATENT DOCUMENTS

| | | | | |
|---|---|---|---|---|
| 2,676,680 A | * | 4/1954 | Kindorf .................... 403/22 |
| 3,005,292 A | * | 10/1961 | Reiland ..................... 52/99 |
| 3,248,994 A | * | 5/1966 | Mortensen ............... 411/344 |
| 3,288,014 A | * | 11/1966 | Mortensen ............... 411/344 |
| 3,483,910 A | * | 12/1969 | Van Huffel et al. ......... 411/112 |
| 3,494,646 A | * | 2/1970 | Cumber ..................... 403/190 |
| 3,507,315 A | * | 4/1970 | Tummarello ............... 411/103 |
| 3,640,328 A | * | 2/1972 | Tummarello ............... 411/103 |
| 3,707,898 A | * | 1/1973 | Holly ....................... 411/344 |
| 4,027,711 A | * | 6/1977 | Tummarello ............... 411/172 |
| 4,120,231 A | * | 10/1978 | Neumayer ................. 411/340 |
| 4,410,298 A | | 10/1983 | Kowalski |
| 4,460,299 A | * | 7/1984 | Kowalski .................. 411/85 |
| 4,571,135 A | * | 2/1986 | Martin et al. .............. 411/85 |
| 4,666,355 A | * | 5/1987 | Stover ...................... 411/85 |
| 4,784,552 A | * | 11/1988 | Rebentisch ................ 411/85 |
| 4,784,554 A | | 11/1988 | Break |
| 4,950,099 A | * | 8/1990 | Roellin ..................... 403/348 |
| 5,054,978 A | * | 10/1991 | Kowalski .................. 411/85 |
| 5,078,537 A | * | 1/1992 | Nomura .................... 411/84 |
| 5,116,161 A | | 5/1992 | Faisst |
| 5,172,527 A | | 12/1992 | Ault |
| 5,411,356 A | | 5/1995 | Travis et al. |
| 5,590,504 A | * | 1/1997 | Heard et al. ............... 52/730.1 |
| 5,624,217 A | * | 4/1997 | Hungerford, Jr. .......... 411/85 |
| 5,779,412 A | * | 7/1998 | Nagai et al. ............... 411/85 |
| RE36,681 E | * | 5/2000 | Rinderer .................... 411/85 |

(Continued)

*Primary Examiner*—Flemming Saether
*Assistant Examiner*—David Reese
(74) *Attorney, Agent, or Firm*—The Webb Law Firm

(57) ABSTRACT

A restraint clip for suspending a load-bearing object includes an engaging member having a body defining an engaging member hole, two abutting surfaces, and two non-abutting surfaces; a lock having a lock body with a base defining a lock hole spatially aligned with the engaging member hole, wherein the lock coacts with the engaging member; a fastener extending along a longitudinal axis threadably engaged with the engaging member hole engaged with the lock hole and threadably engaged with a threaded stop hole, whereby the engaging member is adapted to move along the longitudinal axis relative to the fastener when the fastener is rotated about a longitudinal axis.

25 Claims, 3 Drawing Sheets

U.S. PATENT DOCUMENTS 6,226,952 B1 * 5/2001 Romeu Guardia ............ 52/698
6,290,426 B1 * 9/2001 van Gijsel et al. ....... 403/374.3
6,413,005 B1 7/2002 Massie
6,575,680 B2 6/2003 Herb et al.

* cited by examiner

RESTRAINT CLIP

This application is a continuation-in-part of U.S. patent application Ser. No. 10/763,130, filed Jan. 22, 2004 now abandoned, entitled Restraint Clip.

BACKGROUND OF THE INVENTION

1. Field of the Invention

This invention relates to a restraint clip for use in suspending a load-bearing object from a supporting roof structure.

2. Description of Related Art

It is commonplace in today's society to go to a theme restaurant, sports coliseum, shopping mall, convention center, and the like, and witness a heavy object hanging from the ceiling. These objects are suspended from the ceiling using a variety of methods, and the objects can be anything from an automobile, a motorcycle, a guitar, etc.

One current method of suspending heavy objects is to directly bolt the object from the ceiling. However, this method disrupts the integrity of the ceiling surface, allowing for leaks and the possibility that the strength of the ceiling is compromised.

Another method is to attach an object to the bottom of a bolt with a wedge at the top of the bolt, whereby the wedge fits snugly within the recess of a rib of roof decking. This method of suspending heavy objects from a ceiling is not failproof, however, as the wedge may shift from the weight of the load or due to high levels of vibrations, or seismic activity.

Thus, it is an object of the present invention to provide an apparatus designed to allow the suspension of heavy objects from a ceiling without affecting the structural integrity of the ceiling.

SUMMARY OF THE INVENTION

The foregoing need for an apparatus designed to allow suspension of heavy objects from a ceiling without affecting the structural integrity of the ceiling is addressed in the present invention.

The apparatus for allowing the suspension of heavy objects from a ceiling is a restraint clip which includes an engaging member, wherein the engaging member has a body defining an engaging member hole, two abutting surfaces, and two non-abutting surfaces. The restraint clip also has a lock, wherein the lock has a lock body with a base defining a lock hole coaxial with the threaded engaging member hole and whereby the lock coacts with the engaging member. The restraint clip also has a fastener, which may be a bolt or threaded bar, extending along a longitudinal axis threadably engaged with the engaging member hole and passing through the lock hole. A washer and a stop are also provided. The fastener passes through a washer hole of the washer and is threadably engaged with the stop through the stop hole, whereby the engaging member is adapted to move along the longitudinal axis relative to the fastener when the fastener is rotated about the longitudinal axis. Furthermore, the engaging member is able to be restrained from rotating about the longitudinal axis by the lock. The lock body has a first vertical arm extending from the base, wherein the first vertical arm abuts one of the two non-abutting surfaces of the engaging member. The lock body also has a second vertical arm extending from a second side of the planar base in parallel with the first vertical arm, wherein the second vertical arm abuts the other of the two non-abutting surfaces of the engaging member. The lock body has a first wing and a second wing extending therefrom.

The present invention is also directed toward a restraint clip system, comprising a supporting structure having a body, said supporting structure body defining a rib, the rib having a recess with converging walls. The system also has an engaging member, the engaging member having a body defining an engaging member hole, two abutting surfaces, and two non-abutting surfaces. The system also has a lock having a lock body with a base defining a lock hole spatially aligned with the threaded engaging member hole, wherein the lock coacts with the engaging member. Also included is a fastener extending along a longitudinal axis threadably engaged with the engaging member hole and engaged with the lock hole, whereby the two abutting surfaces of the engaging member coact with the converging walls of the rib.

The present invention is also directed toward a method of suspending heavy objects from a ceiling using the restraint clip system, the method comprising the steps of:

(a) providing a supporting structure having a body, said supporting structure body defining a rib, the rib having a recess with converging walls;

(b) providing an engaging member, the engaging member having a body with a base defining an engaging member hole, two abutting surfaces, and two non-abutting surfaces;

(c) providing a lock having a lock body defining a lock hole spatially aligned with the threaded engaging member hole, wherein the lock coacts with the engaging member;

(d) providing a stop, the stop having a body defining a threaded stop hole;

(e) providing a fastener extending along a longitudinal axis threadably engaged with the engaging member hole, engaged with the lock hole, and threadably engaged with the stop hole, wherein the engaging member is adapted to move along a longitudinal axis relative to the fastener when the fastener is rotated about the longitudinal axis;

(f) positioning the engaging member so as to have the non-abutting surfaces coact with the lock body;

(g) positioning the engaging member so as to have the two abutting surfaces of the engaging member coact with the converging walls of the rib, wherein the lock secures the engaging member in a desired position in the rib; and (h) moving the lock body along the longitudinal axis while rotating the fastener so that the surfaces of the lock contact the surfaces of the supporting structure and the surfaces of the engaging member contact the surfaces of the supporting structure.

DETAILED DESCRIPTION OF THE INVENTION

Figure 1:
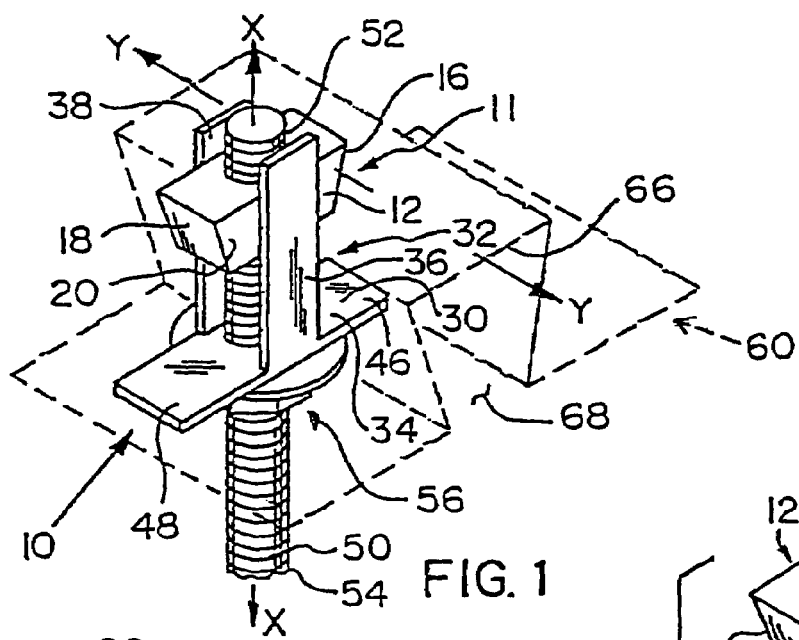
FIG. 1 is a top perspective view of a restraint clip system made in accordance with the present invention installed in decking shown in phantom.

A restraint clip 10 according to the present invention is illustrated in FIGS. 1-8. As depicted in FIG. 1, the restraint clip 10 includes an engaging member 11 held into place by a lock 30 in cooperation with a fastener 50 and a stop 56 within a supporting structure 60, such as decking, shown in phantom.

Figure 2:
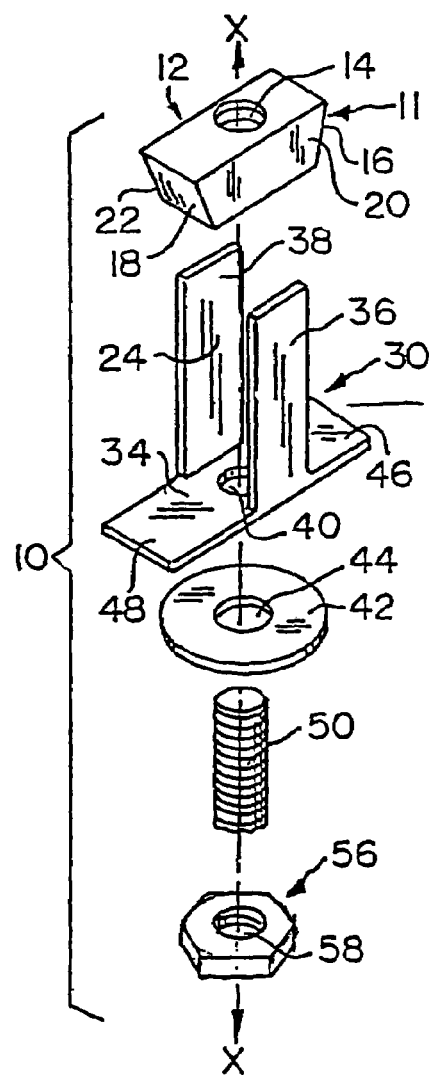
FIG. 2 is an exploded elevational view of the restraint clip shown in FIG. 1.
Figure 4:
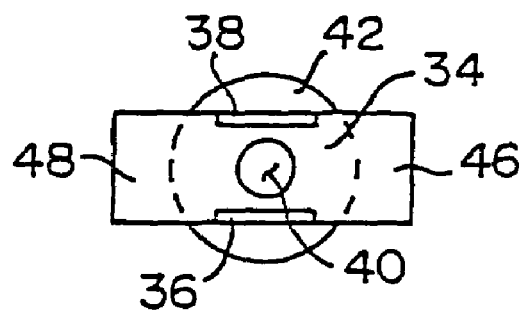
FIG. 4 is a top plan view of a restraint clip made in accordance with the present invention.
Figure 6:
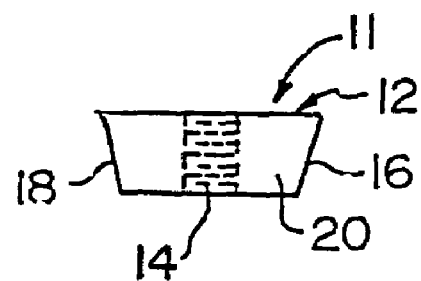
FIG. 6 is a side elevational view of an engaging member made in accordance with the present invention.
Figure 5:
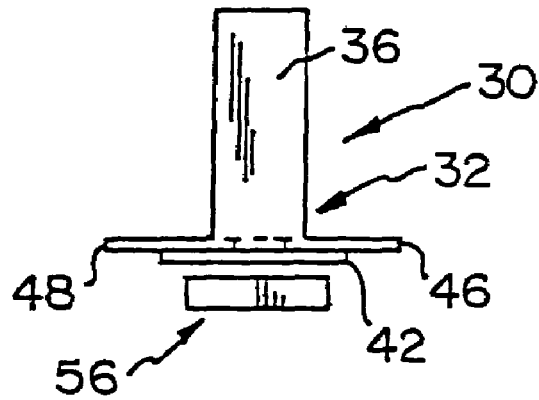
FIG. 5 is a side elevational view of the restraint clip shown in FIG. 4.
Figure 7:
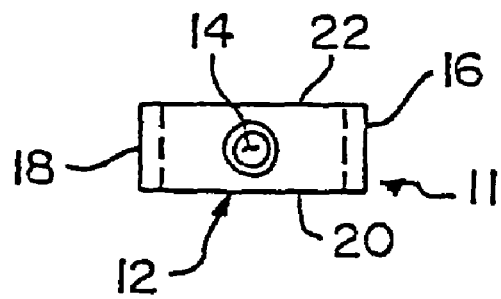
FIG. 7 is a top plan view of the engaging member shown in FIG. 6.
Figure 8:
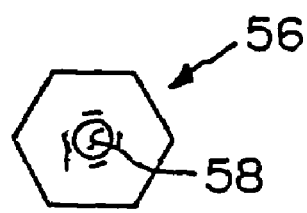
FIG. 8 is a top plan view of a stop made in accordance with the present invention.

As shown in FIGS. 1, 2 and 5, the engaging member 11 has a body 12 defining a threaded hole 14 located within. The engaging member 11 also has a first abutting surface 16, a second abutting surface 18, a first non-abutting surface 20 and a second non-abutting surface 22. The two abutting surfaces 16, 18 may be non-parallel flat or planar diverging surfaces extending over the length of each abutting surface 16 and 18, such as shown in FIGS. 1, 2, 3a, 3b and 6. As shown in FIGS. 1, 2 and 5, the lock 30 has a lock body 32 and a planar base 34, and a first arm 36 extends perpendicularly from the planar base 34 on a first side thereof and a second arm 38 extends from a second side of the planar base 34 in parallel with the first arm 36. The two spatially separated vertical arms 36, 38 define an engaging member 11 recess 24, wherein the arms 36, 38 coact with the two non-abutting surfaces 20, 22 of the engaging member 11. The two non-abutting surfaces 20, 22 are contained in parallel planes and at least one of the inner surfaces of the vertical arms 36, 38 extend in the parallel planes. The base 34 has a hole 40 defined therein and a washer 42 with a hole 44 in alignment with the base hole 40 is provided. The washer 42 may be attached to the base 34 or be a separate component. The washer 42 sandwiches the lock 30 with the engaging member 11. The base 34 also has a first planar wing 46 and a second planar wing 48 extending therefrom.

As shown in FIGS. 1-3, the threaded fastener 50 extends along a longitudinal axis X and threadably engages with the engaging member 11 through hole 14, engages with the base 34 through hole 40, engages with the washer 42 through hole 44 and threadably engages with the stop 56 through hole 58, wherein the engaging member 11 is adapted to move along a longitudinal axis X relative to the fastener 50 when the fastener 50 is rotated about the longitudinal axis X. The fastener has a first end 52 and a second end 54. The fastener may be a bolt or other suitable connecting device, such as a threaded rod. The stop 56 may be a nut or a pin, or other suitable connecting device known in the art.

As shown in FIGS. 1 and 3, the supporting structure 60 is decking, such as roof deck, sold under the trade-mark ER2RA which is owned by the assignee of the present patent application and incorporated herein by reference. The decking includes a plurality of ribs spaced apart by flat sections. The rib is dovetail shaped and includes a converging wall 62 and a converging wall 64 extending from a top wall 66 and forming a recess 68. The supporting structure 60 has ledges or flat sections 70 and 72 in parallel with the top wall 66.

As shown in FIGS. 1, 2, 3a, 3b, 6 and 7, the engaging member 11 is shown as having a wedge shaped body 12. Although the engaging member 11 is preferably wedge shaped or a solid rectangular prism, any shaped body structure in which interaction with the walls 62, 64 of the supporting structure 60 will occur and provide a locking as described herein would be sufficient. For example, the engaging member could be oblong shaped, such as an ellipsoid, or rectangularly shaped, such as a solid rectangle.

The engaging member 11, lock 30, washer 42, fastener 50, lock 56, supporting structure 60, and their component parts are constructed of a resilient material, such as metal. However, any suitable material able to withstand the load weight and provide the desired characteristics may be used for one or more of the components.

Figure 3A:
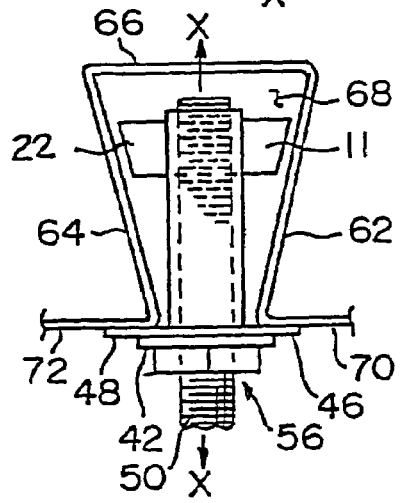
FIG. 3a is a front elevational view of the restraint clip system shown in FIG. 1 within decking with the engaging member disengaged.
Figure 3B:
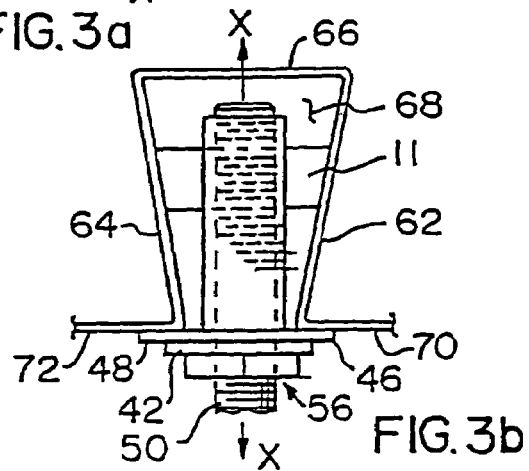
FIG. 3b is a front elevational view of the restraint clip system shown in FIG. 1 within decking showing the engaging member locked in place.

As shown in FIGS. 1 and 3, the fastener 50 threadably engages the engaging member 11 through the engaging member hole 14, the fastener engages the washer 42 through the washer hole 44 and the fastener threadably engages the stop 56 through the stop hole 58. The fastener 50 engages the lock 30 through the lock hole 40, the lock being held in place via compression of the washer 42 upon the flat sections 70 and 72 of the supporting structure. The compression of the washer 42 is accomplished via upward resistance of the stop 56. The connected components fit inside the recess 68 of the supporting structure 60. When the engaging member 11 moves along a longitudinal axis X relative to the fastener 50 when the fastener 50 is rotated about the longitudinal axis, the abutting surfaces 16, 18 coact with the walls 62, 64 of the supporting structure 60 over their entire respective surfaces as shown in FIGS. 1, 3a and 3b. The lock wings 46, 48 prevent the engaging member 11 from further movement via interaction with supporting structure ledges 70, 72. Lock arms 36, 38 hold the engaging member 11 in a secured position by abutting the non-abutting surfaces of the engaging member within the recess 68 of the supporting structure 60 and prevent the engaging member 11 from rotating any further once in a locked position.

As will be appreciated by one skilled in the art, the engaging member 11 may be held in a secure position with the use of only one lock arm, either 36 or 38, as one lock arm would prevent the engaging member 11 from moving from side to side in a similar fashion as using both lock arms 36, 38. However, in the preferred embodiment, both lock arms 36, 38 are used.

Once the restraint clip 10 is in place within the supporting structure 60, a heavy load-bearing object (not shown) may be securably attached to the fastener 50 at a lower portion of second end 54 and one will not have to worry about the restraint clip 10 falling out of the supporting structure 60 due to the interaction of the restraint clip system. This is especially important if seismic conditions, such as an earthquake, may occur while the restraint clip 10 is in place.

FIG. 3a and FIG. 3b illustrate the engaging member 11 within the recess 68 of the supporting structure 60. In FIG. 3a, the engaging member 11 is not locked in place as it is not flush with the walls 62, 64 of the supporting structure 60 and the walls 62, 64 of the supporting structure 60 are not placed in compression. Movement of the engaging member 11 is initiated once the wings 46, 48 of the lock 30 are pressed up against the ledges 70, 72 of the supporting structure 60, the lock 30 being held in position by engagement of the fastener 50 with the washer 42 through hole 44 with upward compression accomplished via threaded engagement of the fastener 50 with the stop 56 through stop hole 58. Once the lock 30 is held in position, the fastener 50 is rotated and the abutting surfaces 16, 18 contact the walls 62, 64 of the supporting structure 60 in a possibly cockeyed state. As shown in FIG. 3*b*, as the engaging member 11 travels down the fastener 50, it engages flush with the walls 62, 64 of the supporting structure 60 and wedges into place as compression of the walls 62, 64 of the supporting structure 60 occurs. The arms 36, 38 of the lock 30 restrict side to side movement of the engaging member 11 via coacting with the non-abutting surfaces 20, 22 of the engaging member 11.

The engaging member 11 may be inserted into the recess 68 of the supporting structure 60 through either the X or Y axis. X axis insertion involves sliding the engaging member 11, with or without the fastener 50 attached, into the recess 68 from the bottom of the supporting structure 60 upward. To facilitate insertion, the engaging member 11 should be rotated along the Y axis so that the abutting surfaces 16, 18 of the engaging member 11 are able to fit through the recess 68 without being stopped by the supporting structure 60 ledges 70, 72. Once the engaging member 11 is inside the recess 68 of the supporting structure 60, the engaging member 11 may be locked into place as discussed above. Alternatively, Y axis insertion involves sliding the engaging member 11, with or without the fastener 50 attached, into the recess 68 from the front or back of the supporting structure 60 inward. Once the engaging member 11 is inside the recess 68 of the supporting structure 60, the engaging member 11 may be locked into place as discussed above. It is also important to note that multiple restraint clip 10 devices may be attached to a supporting structure 60 at one time. Additionally, a restraint clip 10 may be loosened and removed or loosened and moved along the Y axis and retightened for quick spacing adjustments. The present invention prevents the wedge shaped engaging member 11 from rotating from horizontal or vibrational loads and falling out of dovetail shaped ribs and is particularly useful in seismic building zones or for use in a high vibration environment.

Figure 9:
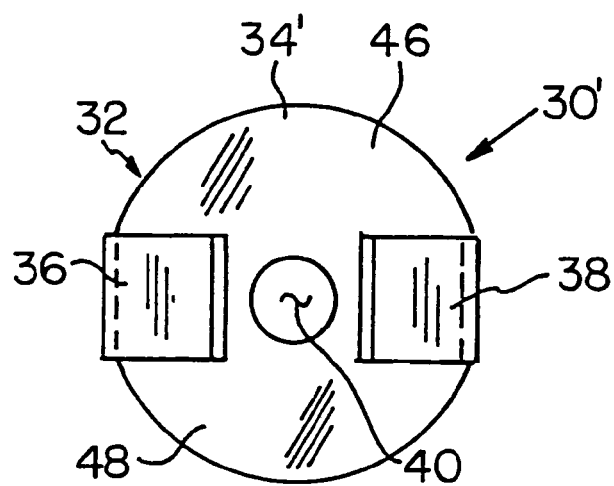
FIG. 9 is a top plan view of a lock made in accordance with a second embodiment of the present invention.
Figure 10:
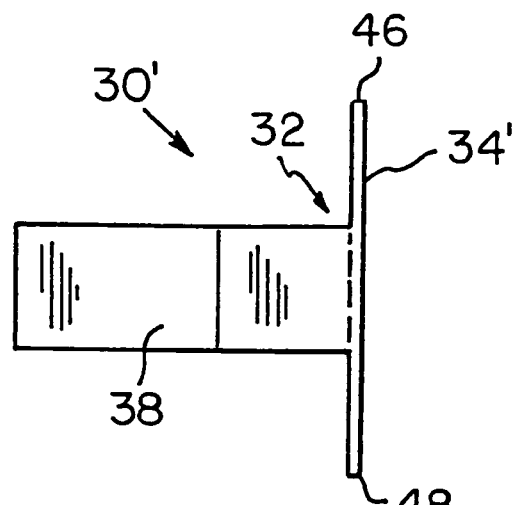
FIG. 10 is a side elevational view of the lock shown in FIG. 9.
Figure 11:
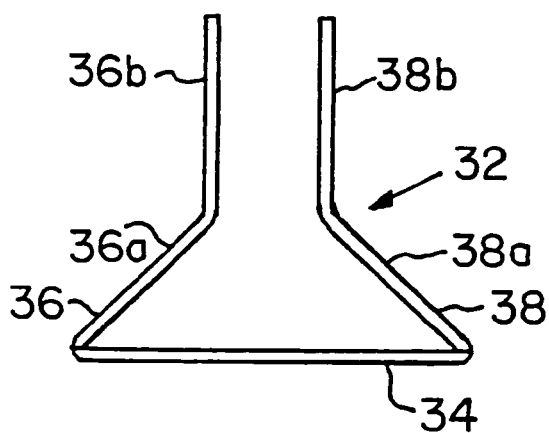
FIG. 11 is a front elevational view of the lock shown in FIG. 9.

FIGS. 9-11 show a second embodiment of a lock 30' for the restraint clip 10 that is similar to lock 30 except for the differences noted below. Like reference numerals will be used for like parts. As shown in FIGS. 9-11, the lock 30' has a lock body 32 having an annular base 34', and a first arm 36 vertically extending from the annular base 34' on a first side thereof and a second arm 38 vertically extending from a second side of the annular base 34' spaced apart from the first arm 36. The first arm 36 defines a first angled portion 36*a* and a first upper portion 36*b*, and the second arm 38 defines a second angled portion 38*a* and a second upper portion 38*b*. The first angled portion 36*a* and the second angled portion 38*a* extend from each side of the annular base 34' toward each other, and the first upper portion 36*b* and the second upper portion 38*b* extend from each end of the first angled portion 36*a* and the second angled portion 38*a*, respectively. The first upper portion 36*b* and the second upper portion 38*b* are parallel to each other. The two spatially separated vertical arms 36, 38 of lock 30' define an engaging member 11 recess 24, wherein the arms 36, 38 coact with the two non-abutting surfaces 20, 22 of the engaging member 11 in the same manner as lock 30 shown in FIGS. 1 and 2. The two non-abutting surfaces 20, 22 are contained in parallel planes and at least one of the inner surfaces of the first and second upper portions 36*b*, 38*b* of vertical arms 36, 38, respectively, extend in the parallel planes. The annular base 34' also has a hole 40 defined therein for receipt of the fastener 50. The outer diameter of the annular base 34' can be equal to the distance between the outer edges of wings 46 and 48. In any case, the diameter of annular base 34' should be greater than an opening of the recess 68 and the width of the vertical arms 36 and 38 should be less than the opening of recess 68. Lock 30' can be a substitute for lock 30 and operates in the same manner of lock 30. However washer 42 is not needed for this arrangement since the annular base 34' acts as a washer.

The present invention has been described with reference to the preferred embodiments. Obvious modifications, combinations and alterations will occur to others upon reading the preceding detailed description. It is intended that the invention be construed as including all such modifications, combinations and alterations insofar as they come within the scope of the appended claims or the equivalents thereof.

The invention claimed is:

1. A restraint clip comprising:
an engaging member, the engaging member having a body defining an engaging member hole extending from a top surface through a bottom surface of the engaging member and two abutting surfaces connecting the top surface and the bottom surface, wherein each abutting surface is planar along substantially the entire distance between the top surface and the bottom surface;
a lock having a lock body with an annular base defining a lock hole spatially aligned with the engaging member hole, wherein said lock coacts with the engaging member, wherein the engaging member has two non-abutting surfaces and the lock body has a first vertical arm extending from the base, wherein a side of the first vertical arm abutting one of the two non-abutting surfaces of the engaging member is planar and is unattached to the engaging member;
a fastener extending along a longitudinal axis threadably engaged with the engaging member hole and passing through the lock hole; and
a stop attached to said fastener coacting with said lock, whereby the engaging member is adapted to move along the longitudinal axis relative to the fastener when the fastener is rotated about the longitudinal axis, wherein movement of the fastener in one direction decreases the distance between the engaging member and the lock body base, such that the top surface of the engaging member moves away from a distal-most portion of the first vertical arm.

2. The restraint clip of claim 1, wherein the first vertical arm defines a first angled portion and a first upper portion extending from the base, wherein the first upper portion of the first vertical arm abuts one of the two non-abutting surfaces of the engaging member.

3. The restraint clip of claim 2, wherein the lock body has a second vertical arm defining a second angled portion and a second upper portion extending from a second side of the base spaced apart from the first vertical arm, wherein the first upper portion of the first arm and the second upper portion of the second arm are parallel to each other, and wherein second upper portion of the second vertical arm abuts the other of the two non-abutting surfaces of the engaging member.

4. The restraint clip of claim 3, wherein the annular base having two spatially separated vertical arms define an engaging member receiving recess therebetween.

5. A restraint clip system, comprising:
a supporting structure having a body, the supporting structure body defining a rib, the rib having a recess with converging walls;
an engaging member, the engaging member having a body defining an engaging member hole and two abutting surfaces which are converging from a top surface to a bottom surface and wherein each abutting surface is planar;
a lock having a lock body with an annular base defining a lock hole spatially aligned with the engaging member hole, wherein said lock coacts with the engaging member;
a stop, the stop having a body defining a threaded stop hole; and
a fastener extending along a longitudinal axis threadably engaged with the engaging member hole, engaged with the lock hole, and threadably engaged with the stop hole,
whereby the two converging abutting surfaces of the engaging member are complementary to and contact over their entire surfaces from said top surface to said bottom surface with the converging walls of the rib.

6. A method of using a restraint clip system, the method comprising the steps of:
  (a) providing a supporting structure having a body, said supporting structure body defining a rib, the rib having a recess with converging walls;
  (b) providing an engaging member, the engaging member having a body with an annular base defining an engaging member hole, two abutting surfaces which are converging from a top surface to a bottom surface and wherein each abutting surface is planar, and two non-abutting surfaces;
  (c) providing a lock having a lock body defining a lock hole spatially aligned with the engaging member hole, wherein the lock coacts with the engaging member;
  (d) providing a stop, the stop having a body defining a threaded stop hole;
  (e) providing a fastener extending along a longitudinal axis threadably engaged with the engaging member hole, engaged with the lock hole, and threadably engaged with the stop hole, wherein the engaging member is adapted to move along a longitudinal axis relative to the fastener when the fastener is rotated about the longitudinal axis;
  (f) positioning the engaging member so as to have the non-abutting surfaces coact with the lock body;
  (g) positioning the engaging member so that the two converging abutting surfaces of the engaging member are complementary to and contact over their entire surfaces from said top surface to said bottom surface with the converging walls of the rib, wherein the lock secures the engaging member in a desired position in the rib; and
  (h) moving the lock body along the longitudinal axis while rotating the fastener so that the surfaces of the lock contact the surfaces of the supporting structure and the surfaces of the engaging member contact the surfaces of the supporting structure.

7. A restraint clip comprising:
an engaging member, the engaging member having a body defining a threaded engaging member hole extending from a top surface through a bottom surface of the engaging member and two abutting surfaces connecting the top surface and the bottom surface, wherein each abutting surface is planar along substantially the entire distance between the top surface and the bottom surface;
a lock having a lock body with a base defining a lock hole spatially aligned with the threaded engaging member hole, wherein said lock coacts with the engaging member, wherein the engaging member has a first and second non-abutting surface and the lock body has a first vertical arm extending from the base, wherein a side of the first vertical arm abutting the first non-abutting surface of the engaging member is planar and is unattached to the engaging member;
a fastener extending along a longitudinal axis threadably engaged with the threaded engaging member hole and passing through the lock hole; and
a stop attached to said fastener coacting with said lock,
whereby the engaging member is adapted to move along the longitudinal axis relative to the fastener when the fastener is rotated about the longitudinal axis, wherein movement of the fastener in one direction decreases the distance between the engaging member and the lock body base, such that the top surface of the engaging member moves away from a distal-most portion of the first vertical arm.

8. The restraint clip of claim 7, wherein the engaging member is a rectangular prism having a dovetail shape.

9. The restraint clip of claim 7, wherein the lock body has a second vertical arm extending from a second side of the planar base in parallel with the first vertical arm, wherein the second vertical arm abuts the second non-abutting surface of the engaging member.

10. The restraint clip of claim 7, wherein the stop is a nut defining a threaded hole threadably received by the fastener, the lock body includes a lock member positioned between the nut and the engaging member.

11. The restraint clip of claim 7, wherein the base of the lock body has a first wing and a second wing extending therefrom.

12. The restraint clip of claim 7, wherein said fastener is a bolt.

13. The restraint clip as claimed in claim 7 further comprising a washer received by the fastener and positioned between the stop and the lock member.

14. A restraint clip comprising:
an engaging member, the engaging member having a body defining a threaded engaging member hole extending from a top surface through a bottom surface of the engaging member and two abutting surfaces connecting the top surface and the bottom surface, wherein each abutting surface is planar along substantially the entire distance between the top surface and the bottom surface;
a lock having a lock body with a planar base defining a lock hole coaxial with the threaded engaging member hole, the base having a spatially separated first and second vertical arm extending from the base that define an engaging member receiving recess, wherein the first and second arms coact with two non-abutting surfaces of the engaging member, wherein a side of the first vertical arm abutting one of the two non-abutting surfaces of the engaging member is planar and is unattached to the engaging member;
a threaded fastener extending along a longitudinal axis threadably engaged with the threaded engaging member hole and engaged with the lock hole; and
a stop having a threaded stop hole threadably received by the fastener,
whereby the engaging member is adapted to move along a longitudinal axis when said fastener is rotated about a longitudinal axis, whereby the engaging member is able to be restrained from rotating about the longitudinal axis by the lock, and wherein movement of the fastener in one direction decreases the distance between the engaging member and the lock body base, such that the top surface of the engaging member moves away from a distal-most portion of the first vertical arm.

15. The restraint clip of claim 14, wherein the two non-abutting surfaces of the engaging member are contained in parallel planes and at least one of an inner surface of the vertical arms extends in the parallel planes.

16. The restraint clip of claim 14, wherein the two abutting surfaces are non-parallel diverging surfaces.

17. The restraint clip of claim 14, wherein the engaging member is a rectangular prism having a dovetail shape.

18. The restraint clip of claim 14 wherein the stop is a nut defining a threaded hole threadably received by the threaded fastener, the lock body includes a lock member positioned between the nut and the engaging member.

19. The restraint clip of claim 14, wherein the base of the lock body has a first wing and a second wing extending therefrom.

20. The restraint clip of claim 14, wherein the fastener is a bolt.

21. A restraint clip system, comprising:
   a supporting structure having a body, the supporting structure body defining a rib, the rib having a recess with converging walls;
   an engaging member, the engaging member having a body defining a threaded engaging member hole and two abutting surfaces which are converging from a top surface to a bottom surface and wherein each abutting surface is planar;
   a lock having a lock body with a base defining a lock hole spatially aligned with the threaded engaging member hole, wherein said lock coacts with the engaging member;
   a stop, the stop having a body defining a threaded stop hole; and
   a fastener extending along a longitudinal axis threadably engaged with the threaded engaging member hole, engaged with the lock hole, and threadably engaged with the stop hole,
   whereby the two converging abutting surfaces of the engaging member are complementary to and contact over their entire surfaces from said top surface to said bottom surface with the converging walls of the rib.

22. The restraint clip system of claim 21, wherein the engaging member is a rectangular prism having a dovetail shape.

23. The restraint clip system of claim 21, wherein the engaging member has two non-abutting surfaces and the lock body has a first vertical arm extending from the base, wherein the first vertical arm abuts one of the two non-abutting surfaces of the engaging member.

24. The restraint clip system of claim 23, wherein the lock body has a second vertical arm extending from a second side of the base in parallel with the first vertical arm, wherein the second vertical arm abuts at one of the two non-abutting surfaces of the engaging member.

25. A method of using a restraint clip system, the method comprising the steps of:
   (a) providing a supporting structure having a body, said supporting structure body defining a rib, the rib having a recess with converging walls;
   (b) providing an engaging member, the engaging member having a body with a base defining an engaging member hole, two planar abutting surfaces which are converging from a top surface to a bottom surface and wherein each abutting surface is planar, and two non-abutting surfaces;
   (c) providing a lock having a lock body defining a lock hole spatially aligned with the threaded engaging member hole, wherein the lock coacts with the engaging member;
   (d) providing a stop, the stop having a body defining a threaded stop hole;
   (e) providing a fastener extending along a longitudinal axis threadably engaged with the engaging member hole, engaged with the lock hole, and threadably engaged with the stop hole, wherein the engaging member is adapted to move along a longitudinal axis relative to the fastener when the fastener is rotated about the longitudinal axis;
   (f) positioning the engaging member so as to have the non-abutting surfaces coact with the lock body;
   (g) positioning the engaging member so that the two converging abutting surfaces of the engaging member are complementary to and contact over their entire surfaces from said top surface to said bottom surface with the converging walls of the rib, wherein the lock secures the engaging member in a desired position in the rib; and
   (h) moving the lock body along the longitudinal axis while rotating the fastener so that the surfaces of the lock contact the surfaces of the supporting structure and the surfaces of the engaging member contact the surfaces of the supporting structure.

* * * * *